(12) United States Patent
Ferchau

(10) Patent No.: US 10,054,711 B2
(45) Date of Patent: Aug. 21, 2018

(54) PHOTOELECTRIC SENSOR AND METHOD OF OPERATING SAME HAVING A FLANK DETECTOR FOR IDENTIFYING EVENT TIMES OF POSITIVE OR NEGATIVE FLANKS OF PULSES OF A RECEIVED SIGNAL

(71) Applicants: PROTECHNA HERBST GMBH & CO. KG, Neubiberg (DE); KARL MAYER Textilmaschinenfabrik GmbH, Obertshausen (DE)

(72) Inventor: Alfred Ferchau, Frankfurt (DE)

(73) Assignees: PROTECHNA HERBST GMBH & CO. KG, Neubiberg (DE); KARL MAYER TEXTILMASCHINENFABRIK GMBH, Obertshausen (DE)

( * ) Notice: Subject to any disclaimer, the term of this patent is extended or adjusted under 35 U.S.C. 154(b) by 176 days.

(21) Appl. No.: 15/269,427

(22) Filed: Sep. 19, 2016

(65) Prior Publication Data

US 2017/0090065 A1 Mar. 30, 2017

(30) Foreign Application Priority Data

Sep. 24, 2015 (DE) .................. 10 2015 116 151

(51) Int. Cl.
*G01V 8/12* (2006.01)
*G01V 8/20* (2006.01)

(52) U.S. Cl.
CPC . *G01V 8/12* (2013.01); *G01V 8/20* (2013.01)

(58) Field of Classification Search
CPC ............. G04F 10/04; G01V 8/12; G01V 8/20
USPC ............................................... 250/221, 214 R
See application file for complete search history.

(56) References Cited

U.S. PATENT DOCUMENTS 5,650,609 A * 7/1997 Mertins .................. A01C 7/105
250/222.1

FOREIGN PATENT DOCUMENTS

DE 3118838 A 12/1982
DE 102011000857 A 8/2012

* cited by examiner

*Primary Examiner* — Que T Le
(74) *Attorney, Agent, or Firm* — Andrew Wilford

(57) ABSTRACT

With a method of operating a photoelectric sensor a pulsed light beam is sent by an emitter, received by a receiver spaced from the emitter, and converted into a received signal. Measurement values of the received signal are recorded by an evaluation device with the method. The recording of the measurement values is synchronized with the received signal by the evaluation device. Event times of positive and/or negative flanks of pulses of the received signal are identified by a flank detector of the evaluation device here. A controller of the evaluation device to which the event times are sent determines a subsequent event time after an event time if this lies within a time interval around an expected subsequent event time. Synchronisation is carried out of at least two successive event times have been identified. Measurement times are determined from the event times for recording the measurement values.

8 Claims, 5 Drawing Sheets

PHOTOELECTRIC SENSOR AND METHOD OF OPERATING SAME HAVING A FLANK DETECTOR FOR IDENTIFYING EVENT TIMES OF POSITIVE OR NEGATIVE FLANKS OF PULSES OF A RECEIVED SIGNAL

FIELD OF THE INVENTION

The present invention relates to a photoelectric sensor. More particularly this invention concerns a method of operating such a sensor.

BACKGROUND OF THE INVENTION

Photoelectric sensors, also known as optoelectronic sensors, are used for detecting objects. With so-called disposable sensors a light beam sent by an emitter is received by a receiver and retransmitted for evaluation as an electric signal.

An optoelectronic sensor for detecting objects with a sending block for sending a light signal and a receiving block for receiving the light signal and generating a received signal from the received light signal is known from DE 10 2011 000 857. The light signal is modulated with a code sequence, wherein a correlation signal is formed from the received signal and the code sequence used in a correlation unit. The correlation unit receives the code sequence. Alternatively an optical synchronisation of the sending block and the receiving block not described in detail will take place.

A photoelectric switching means for detecting an object in the path of the beam between a light source and a photoelectric converter is described in DE 311 88 38 C2. The switching means comprises a light source part, a light receiving part, a signal processing part and an auxiliary part for controlling and synchronizing the operating mode of the light source part and the light receiving part. The light receiving part comprises the photoelectric converter, which converts light falling onto the same into an electric signal. In order to process input data based on the electric signal the signal processing part is equipped with pulse shaper. When a switching means with separately arranged light source and light receiver is used, the light source part is connected with a separate oscillator. The frequency of this oscillator is a little higher than that of an oscillator whose output signal is used as a clock signal for entering input data. The frequency of this oscillator is synchronized with the frequency of the separate oscillator.

Even very short-term interference of the light beam, for example due to external light or through covering, can lead to an interruption of synchronisation with such switching means. Synchronisation is however essential for the use of pulsed light beams. It enables the determination of measurement times within the pulses.

OBJECTS OF THE INVENTION

It is therefore an object of the present invention to provide an improved photoelectric sensor and method of operating same.

Another object is the provision of such an improved photoelectric sensor that overcomes the above-given disadvantages, in particular wherein a simple and safe synchronisation of the evaluation of a pulsed light beam with the pulses of the sent and received light beam is made possible. The recording of measurement values of the received signal, i.e. measurement times, in particular, should be synchronized with the received signal.

SUMMARY OF THE INVENTION

This object is attained in a method of operating a photoelectric sensor according to the invention where a pulsed light beam is sent by an emitter of the sensor.

In one embodiment the emitter comprises a laser transmitter that emits red laser light. Alternatively light beams within visible or invisible frequency range that differs from this is used, for example within the infrared range.

The light beam is received by a receiver spaced from the emitter and converted into a received signal. The receiver for example comprises a photodiode. Measurement values of the received signal are recorded by an evaluation device. The recording of the measurement signal is synchronized with the received signal by the evaluation device.

For this, event times of positive flanks and/or negative flanks of pulses of the received signal are identified by a flank detector of the evaluation device. The determination of at least one flank each of the pulses of the received signal in the form of event times will for example be used for deducing the start and the duration, i.e. the period, of a pulse. A cycle during which the pulses are sent may also be deduced.

An event time that follows another event time during a time interval around an expected subsequent event time is determined by a controller of the evaluation device to which the event times are supplied.

A subsequent event time of, for example, a positive flank is expected following expiry of a period of the received signal. A subsequent event time is therefore accepted as valid only if it lies near the expected transmission frequency.

The selection of an event time during the time interval around the expected subsequent event time only has the advantage that incorrect information, for example caused by lightening or short-term covering, is disregarded for the rest of the time.

A controller of the evaluation device carries out synchronisation if at least two successive event times have been determined. A synchronisation deduces the above described information, periods and for example the start of the pulses from the received signal by means of at least two successive event times.

The controller determines measurement times for recording measurement values from the event times, possibly from this information. For this, one or more measurement times during one pulse, such as a measuring time at the time of a maximum amplitude, are for example determined from the period and the start of a pulse.

Synchronisation is already carried out after determining at least two successive event times. Determining measurement times, and thus the recording of measurement values, can start very rapidly.

Measuring times are deduced directly from the received signal by the controller. One or more oscillators and corresponding circuits are not necessary.

Synchronisation with the received signal also has the advantage that the emitter does not need to be provided with a cycle known to the receiver via a clock line nor a cycle triggering the emitter be made known via a clock line of the receiver. An additional clock line to the emitter is not necessary with this method either.

In one embodiment event times are identified in an asynchronous operating condition of the evaluation device without recording measurement values until a first synchronisation is carried out.

In one embodiment a starting value is stipulated as a value of the time interval in the asynchronous operating condition. The value is for example 30% of the period of a pulse.

In one embodiment measurement values are recorded in a synchronous operating condition of the receiver after at least one synchronisation at specific measurement times.

In one embodiment a value of the time interval is reduced in the synchronous operating condition after a further synchronisation. The time interval is shortened. This reduces the influence of interference.

In one embodiment measurement times corresponding to earlier event times are identified by the controller in a transitional operating condition of the receiver that follows a synchronous operating condition of the receiver, wherein no event time is determined during at least one time interval around an expected subsequent event time.

In one embodiment the light beam is sent by the controller as pulses modulated in a rectangular form, wherein the controller determines a measuring time each for identifying a measurement value of a maximum amplitude and one measuring time for identifying a measurement value for a minimum amplitude from the event times.

In one embodiment differences are calculated from the measurement values for the maximum and the minimum amplitudes and evaluated. A change in the difference for example indicates a monitoring case. If a warp is for example monitored with a photoelectric sensor according to the invention, a specific change in the difference will indicate a brief darkening by a broken thread that runs through the monitoring path. This also enables a detection of small changes in the light intensity.

A photoelectric sensor according to the invention is suitable for carrying out the method of the invention. It has the corresponding described characteristics and advantages of the methods.

A photoelectric sensor is equipped with an emitter for sending a pulsed light beam, with a receiver spaced from the emitter, for receiving the light beam and converting the light beam into a received signal, and with an evaluation device for recording measurement values of the received signal and for synchronizing the recording of measurement values with the received signal.

The evaluation unit comprises a flank detector, designed for identifying event times of positive flanks and/or negative flanks of pulses of the received signal.

The evaluation device comprises a controller, connected with the flank detector and designed for determining a subsequent event after an event time during a time interval around the expected subsequent event time. The controller is designed for carrying out synchronisation if at least two successive event times have been determined. It is designed for determining measurement times for recording measurement values from the event times.

In one embodiment the emitter is designed for sending the light beam as pulses modulated in a rectangular form. The controller is designed for determining a measuring time for identifying a measurement value of a maximum amplitude and a measuring time for identifying a measurement value of a minimum amplitude of the received signal.

In one embodiment the evaluation device comprises an analogue/digital converter for recording measurement values and for generating digital measurement values. The controller is designed for activating the analogue/digital converter. It is connected with the analogue/digital converter for activation and for receiving digital measurement values.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
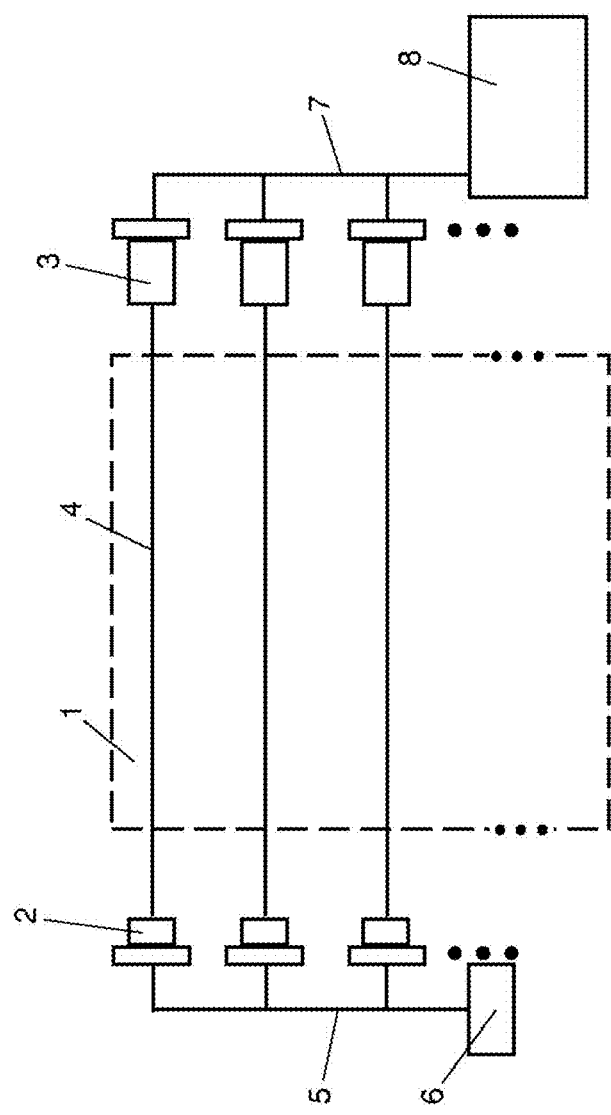
FIG. 1 is a schematic view of an arrangement of several photoelectric sensors according to the invention.

FIG. 1 shows several photoelectric sensors according to the invention, arranged in the shaded area 1 of a warp on a textile machine not shown here. Each photoelectric sensor comprises an emitter 2 and a receiver 3 spaced from the emitter 2.

The emitter 2 is designed for sending a pulsed light beam 4. The light beam 4 is formed by pulses modulated in a rectangular form. The emitter 2 comprises a laser transmitter that emits red light, for example with a wavelength of approximately 750 nm. The photoelectric sensors are positioned in the area 1 of the warp in such a way that a broken thread, falling downwards, will traverse the light beam 4 of at least one sensor.

The emitters 2 are connected to a power source 6 via a power cable 5. The power source 6 supplies power, for example with a voltage of 24 V. The receivers 3 are connected with a controller 8 of the textile machine via a communication line 7.

Figure 2:
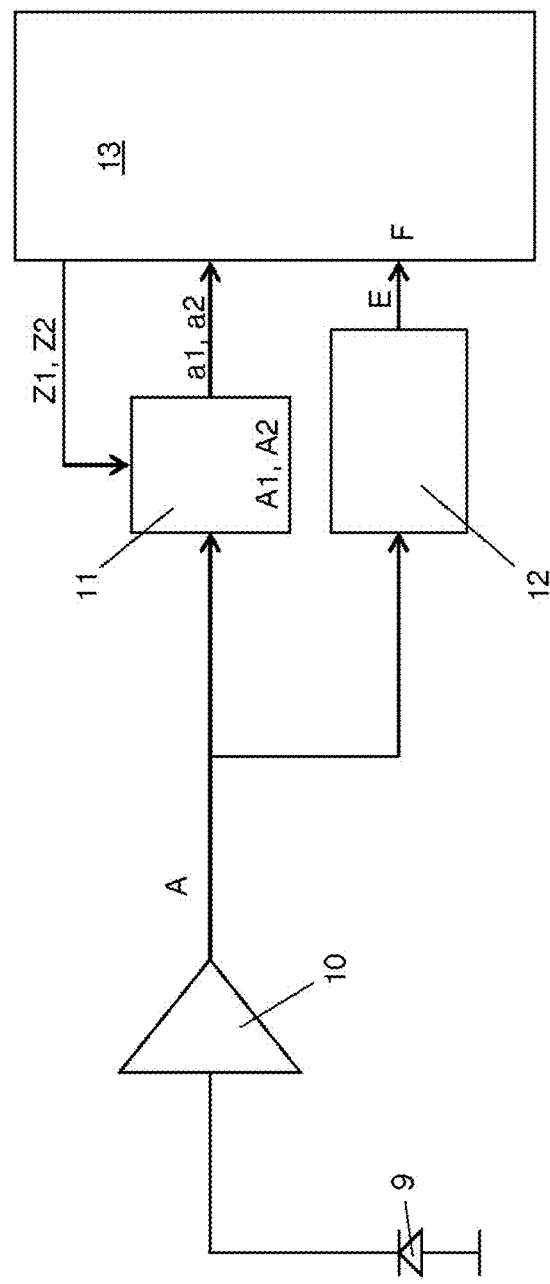
FIG. 2 is a block diagram of a receiver of a photoelectric sensor.

FIG. 2 shows a block diagram of the receiver 2 of a photoelectric sensor, designed for receiving the light beam 4 and also for evaluating the same in this example.

Figure 4:
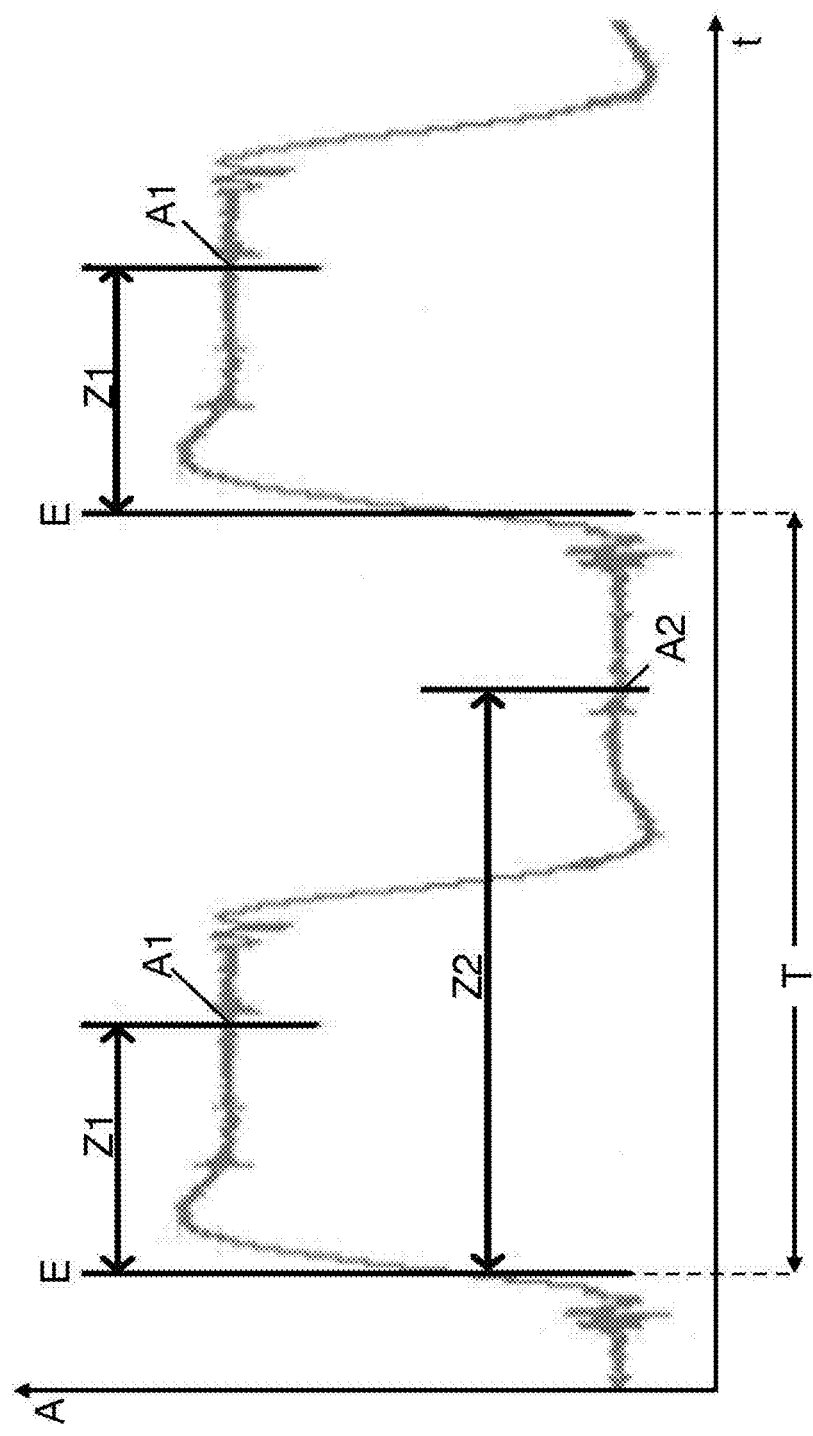
FIG. 4 is a received signal of the photoelectric sensor.

The receiver 2 comprises a receiving device for converting the light beam 4 into a received signal A, a section of which is shown in FIG. 4. The receiving device comprises a photodiode 9 for converting the light beam 4 into an electric signal and an amplifier 10 for amplifying the electric signal into the received signal A.

The receiver 2 comprises an evaluation device for recording measurement values A1, A2 of the received signal A and for synchronizing the recording of measurement values A1, A2 with the received signal A. The evaluation device comprises an analogue/digital converter 11, a flank detector 12 and a controller 13.

The analogue/digital converter 11 is designed for recording the measurement values A1, A2 of the analogue received signal A and converting it into digital measurement values a1, a2. In this example one measurement value A1 of the maximum amplitude and one measurement value A2 of the minimum amplitude each of the rectangular pulse are recorded (FIG. 4).

The flank detector 12 is designed for identifying event times E of positive flanks of the pulses of the received signal A.

The amplifier 10 is connected with an input of the analogue/digital converter 11 and with an input of the flank detector 12 for transmitting the received signal A.

The controller 13 is designed for synchronizing and evaluating measurement values A1, A2.

An output of the analogue/digital converter 11 is connected with the controller 13 for retransmitting the digital measurement values a1, a2 recorded and converted from the analogue received signal A.

The controller 13 is connected with the analogue/digital converter 11 via an activation input for transmitting measurement times Z1, Z2. The controller 13 is designed for activating the analogue/digital converter 11 at measurement times Z1, Z2.

An output of the flank detector 12 is connected with the controller 13 for retransmitting event times E.

The controller 13 is designed for receiving event times E from the flank detector 12 and confirms these as suitable for synchronisation if appropriate. Following receipt of a first event time E the controller 13 determines a subsequent event time E if the same lies within a time interval F around an expected subsequent event time E.

The controller 13 is designed for carrying out a synchronisation. A synchronisation takes place when at least two successive event times E have been determined.

The controller 13 is designed for evaluating measurement values A1, A2. A difference between measurement values A1, A2 each of the maximum and minimum amplitudes are for example calculated and compared with previous differences. If the difference reduces by a predetermined amount, at which a broken thread is for example suspected, the controller 13 produces an alarm signal.

The controller 13 comprises one or more microprocessors. It comprises timer elements for activating the analogue/digital converter 11 as well as computing elements for determining, for example, the start and the end of the time interval and the measurement times Z1, Z2 as well as for evaluating measurement values A1, A2. These elements are designed as switches and/or program sections.

During operation of the photoelectric sensor according to the invention the emitter 2 sends a light beam 4 as pulses modulated in rectangular form. The light beam 4 is received by the receiver 3 which is spaced from the emitter 2. The light beam 4 is converted into an analogue received signal A by the receiving device of the receiver 3, namely by the photodiode 9 and the amplifier 10. Measurement values A1, A2 of the received signal A are recorded and evaluated by the evaluation device. If necessary an alarm signal is produced, which is sent to the controller 8 of the textile machine via the communication line 7.

Event times E of positive flanks of the pulses of the received signal A are identified by the flank detector 12 and sent to the controller 13 for synchronisation.

If the controller 13 has determined at least two successive event times E, i.e. synchronisation has been carried out, measurement times Z1, Z2 are determined from event times E. The controller 13 will determined a successive event time after an event time E only if it was identified during the time interval F around an expected subsequent event time E.

From event times E the controller 13 then deduces a period T of the pulses and calculates the start and end of time interval F, during which a subsequent event time E needs to be taken into consideration, as well as measurement times Z1, Z2 with the aid of period T.

The analogue/digital converter 11 records measurement values A1, A2 and converts them into digital measurement values a1, a2 for the controller 13.

Figure 3A:
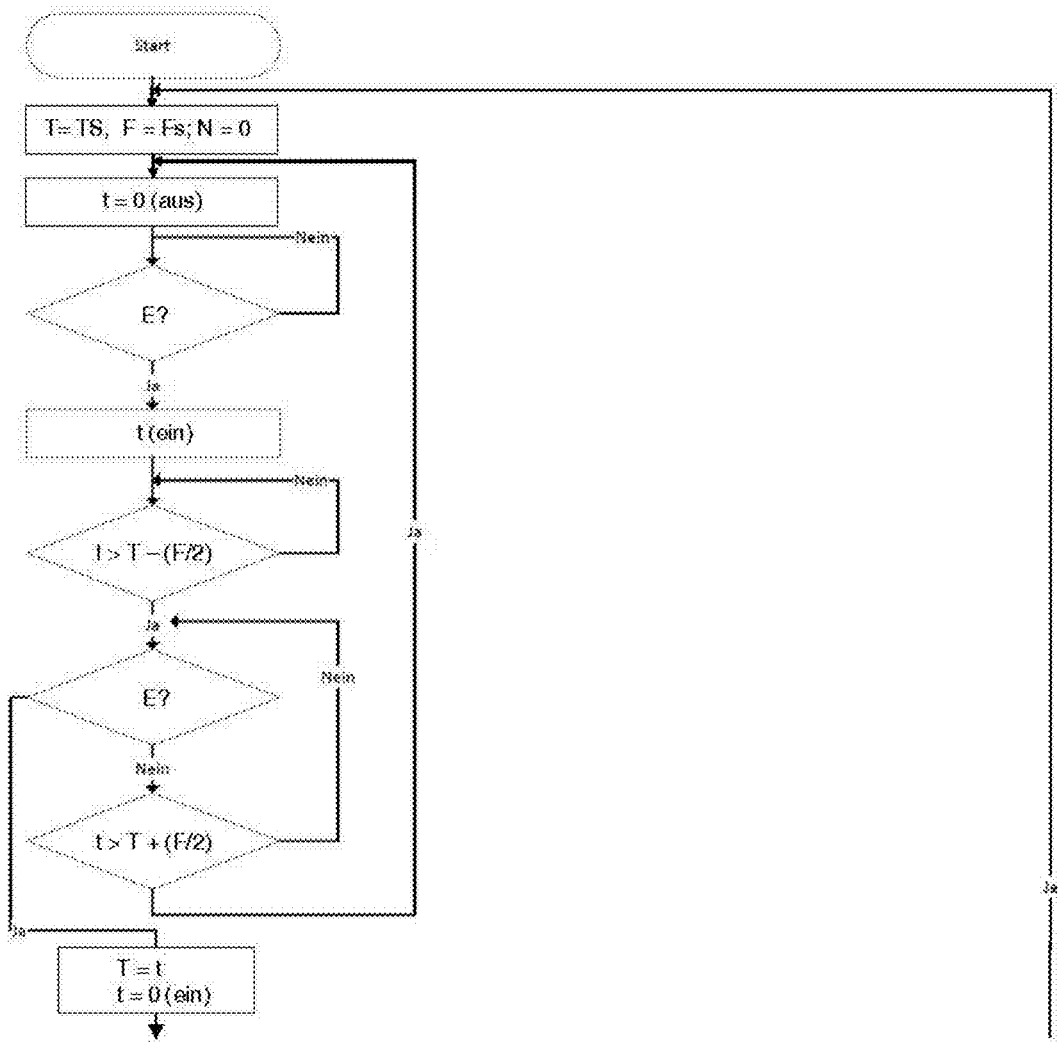
FIGS. 3a and 3b are flow diagrams of a method according to the invention for operating the photoelectric sensor.
Figure 3B:
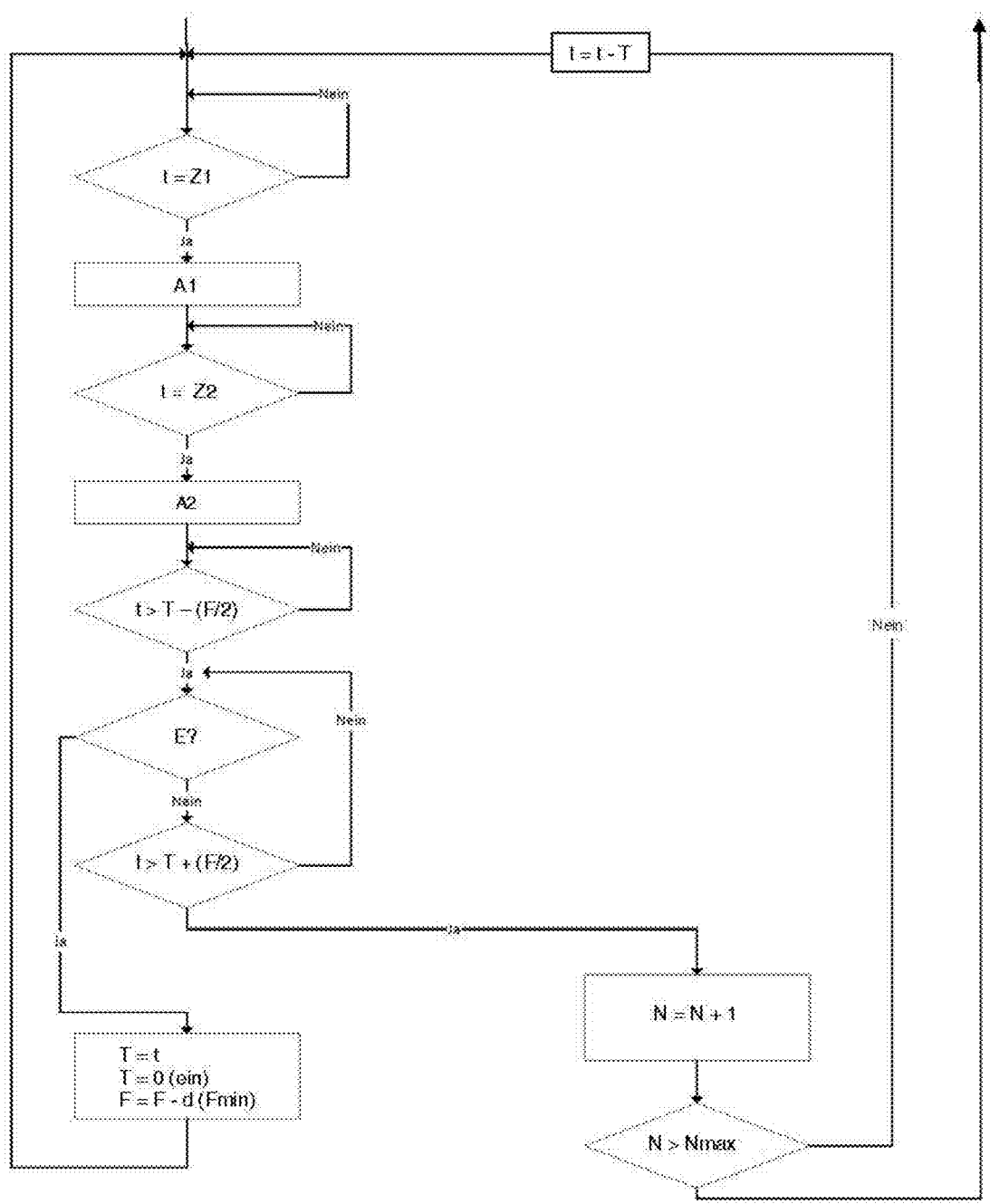

The sequence of a synchronisation is illustrated further in FIGS. 3a and 3b.

When synchronisation starts, event times E are first identified without recording measurement values A1, A2 in an asynchronous operating condition of the receiver 3 until synchronisation has been carried out.

Period T of the pulses and time interval F are then allocated predetermined start values Ts and Fs by the controller 13. A number N for periods T in a transitional operating condition is set to zero by the controller 13.

The controller 13 sets a time variable t to zero.

The controller 13 waits for an event time E of the flank detector 12.

If the flank detector 12 detects a positive flank of the received signal A it will identify an event time E and send this to the controller 13.

The controller 13 then starts a time measurement with time variable t.

The controller 13 calculates a time interval F of $$\text{start: } t > T - (F/2) \text{ to end: } t > T + (F/2).$$

If the flank detector 12 detects no positive flank of a subsequent pulse during this time interval F, and a subsequent event time E is therefore not identified, the controller 13 will set the time variable t to zero.

The receiver 2 stays in the asynchronous operating condition. The controller 13 waits for an event time E of the flank detector 12.

If a positive flank of a subsequent pulse is detected by the flank detector 12 during time interval F and a subsequent event time E is thus identified, synchronisation is carried out. Period T will be given the value of time variable t at the subsequent event time E. Time variable t is set to zero.

A new time measurement with time variable t is started.

Synchronisation is now carried out in a synchronous operating condition of the receiver 2.

The controller 13 activates the analogue/digital converter 11 at time Z1 of time variable t for recording measurement value A1 of the maximum amplitude. Measurement value A1 is digitized into measurement value a1 and sent to the controller 13.

The controller 13 activates the analogue/digital converter 11 at time Z2 of time variable t for detecting measurement value A2 of the minimum amplitude. Measurement value A2 is digitized into measurement value a2 and sent to the controller 13.

The controller 13 calculates a time interval F of $$t > T - (F/2) \text{ to } t > T + (F/2).$$

If a positive flank of a subsequent pulse is detected by the flank detector 12 during time interval F and a subsequent event time E is thus identified, synchronisation is carried out in the synchronous operating condition of receiver 2. Period T will be given the value of time variable up to the last event time E and the time variable t is set to zero.

The value of time interval F is reduced by a value d to a minimum value Fmin.

If no positive flank of a subsequent pulse is detected by the flank detector 12 during this time interval F and no event time E is therefore identified, number N of period T will be increased by 1 by the controller 13 in the transitional operating condition. If number N is smaller than or equal to a maximum number Nmax, the receiver 2 will stay in the transitional operating condition.

Time variable t is reduced by the last period T detected by the controller 13:

$$t = t - T.$$

Measurement values A1, A2 are recorded as described for the synchronous operating condition.

If a positive flank of a subsequent pulse is detected by the flank detector 12 during time interval F and a subsequent event time E is therefore identified, synchronisation is continued in the synchronous operating condition of receiver 2.

If no positive flank of a subsequent pulse is detected by the flank detector 12 during this time interval F and no event time E is therefore identified, the receiver 2 will stay in the transitional operating condition.

If number N is greater than the maximum number Nmax, receiver 2 will be switched to the asynchronous operating condition by the controller 13. The controller 13 will start a new synchronisation in the asynchronous operating condition.

In one alternative, synchronisation is carried out if at least three successive event times E have been identified by the controller 13.

In one alternative, the evaluation device comprises a flank detector 12 for identifying event times E of positive and/or negative flanks of pulses of the received signal A. Measuring times for recording amplitude values are adjusted accordingly.

In one alternative the evaluation device or individual parts of the evaluation device, for example the controller 13, are designed as separate devices that are not included in the receiver.

In one alternative queries, for example for the identification of event times, are processed at a frequency of 10 to 20 kHz

I claim:

1. A method of operating a photoelectric sensor, the method comprising the steps of:
    sending a pulsed light beam from an emitter to a receiver spaced from the emitter and there converting the light beam into a received signal;
    recording measurement values of the received signal by an evaluation device;
    synchronizing recording of the measurement values with the received signal;
    identifying event times of positive or negative flanks of pulses of the received signal by a flank detector of the evaluation device; and
    determining a subsequent event time during a time interval around an expected subsequent event time by a controller of the evaluation device to which the event times are sent after an event time.

2. The method defined in claim 1, wherein event times are identified in an asynchronous operating condition of the receiver without recording measurement values until synchronisation is carried out.

3. The method defined in claim 1, wherein the measurement values are recorded at the determined measurement times after at least one synchronisation in a synchronous operating condition of the receiver.

4. The method defined in claim 3, wherein a value of the time interval is reduced after a further synchronisation by the controller in the synchronous operating condition.

5. The method defined in claim 3, wherein measurement times equaling earlier event times are determined by the controller in a transitional operating condition of the receiver that follows a synchronous operating condition, in which no event time is identified during at least one time interval around an expected subsequent event time.

6. The method defined in claim 1, wherein the light beam is sent as pulses modulated in a rectangular form, wherein the controller determines a measuring time each from the event times for identifying a measurement value of a maximum amplitude and a measuring time for identifying a measurement value of a minimum amplitude of the received signal.

7. A photoelectric sensor comprising:
    an emitter for sending a pulsed light beam;
    a receiver spaced from the emitter for receiving the light beam and converting the light beam into a received signal; and
    an evaluation device for recording measurement values of the received signal and for synchronizing recording of the measurement values with the received signal, the evaluation unit including
        a flank detector for identifying event times of positive or negative flanks of pulses of the received signal, and
        a controller connected with the flank detector for receiving the event times and for determining a subsequent event time during a time interval around an expected subsequent event time after an event time, for carrying out synchronisation if at least two successive event times have been determined, and for determining measurement times for recording measurement values from the event times.

8. The photoelectric sensor defined in claim 7, wherein the emitter is designed for sending the light beam as pulses modulated in a rectangular form, wherein the controller is designed for determining a measurement time for identifying a measurement value of a maximum amplitude and a measurement time for identifying a measurement value of a minimum amplitude of the received signal.

* * * * *